July 31, 1956
R. A. PETERSON
2,757,357
SEISMIC WAVE FILTERING SYSTEM
Filed Aug. 12, 1953
4 Sheets—Sheet 1
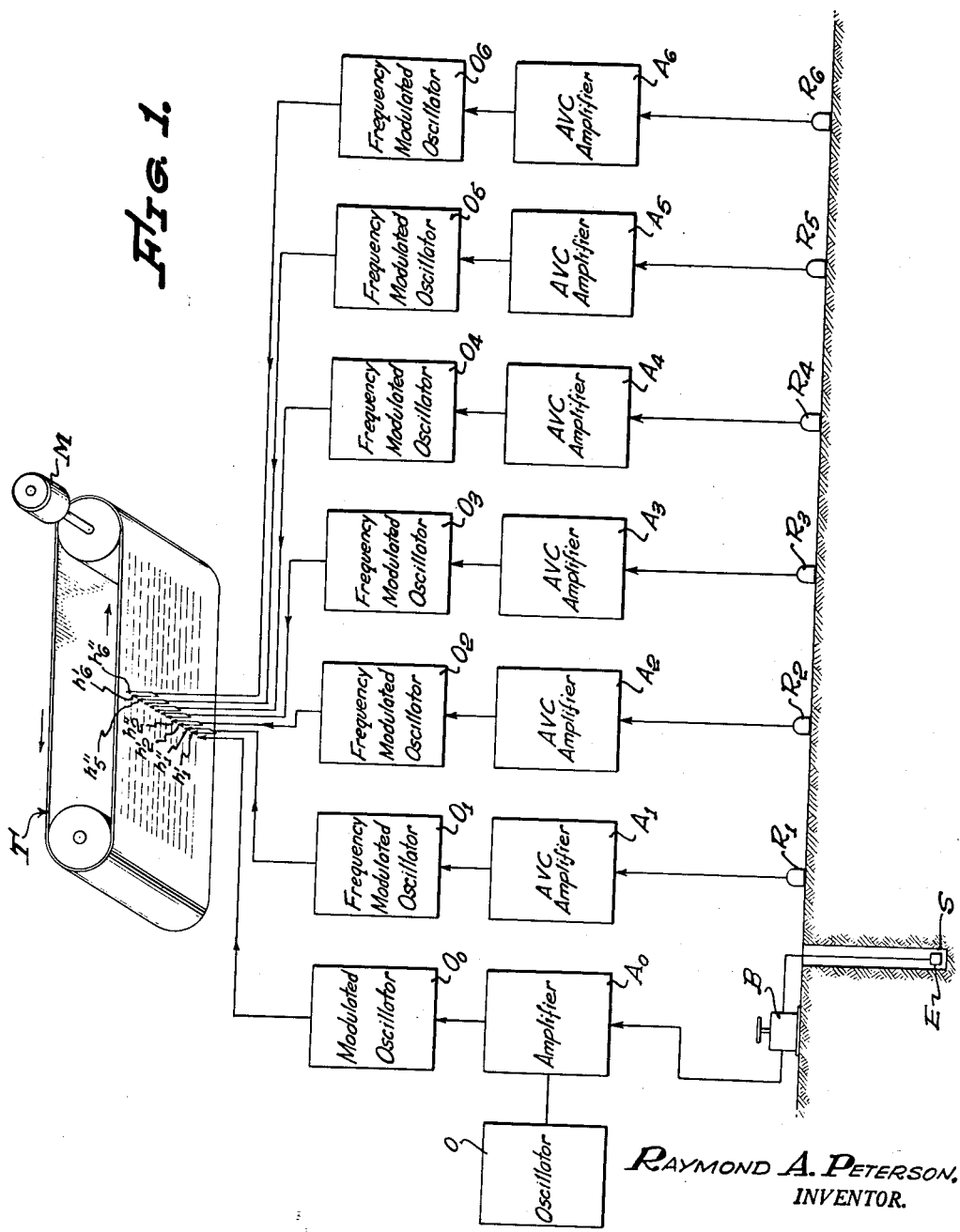
RAYMOND A. PETERSON,
INVENTOR.
BY 
ATTORNEY.

July 31, 1956
R. A. PETERSON
2,757,357
SEISMIC WAVE FILTERING SYSTEM
Filed Aug. 12, 1953
4 Sheets-Sheet 2
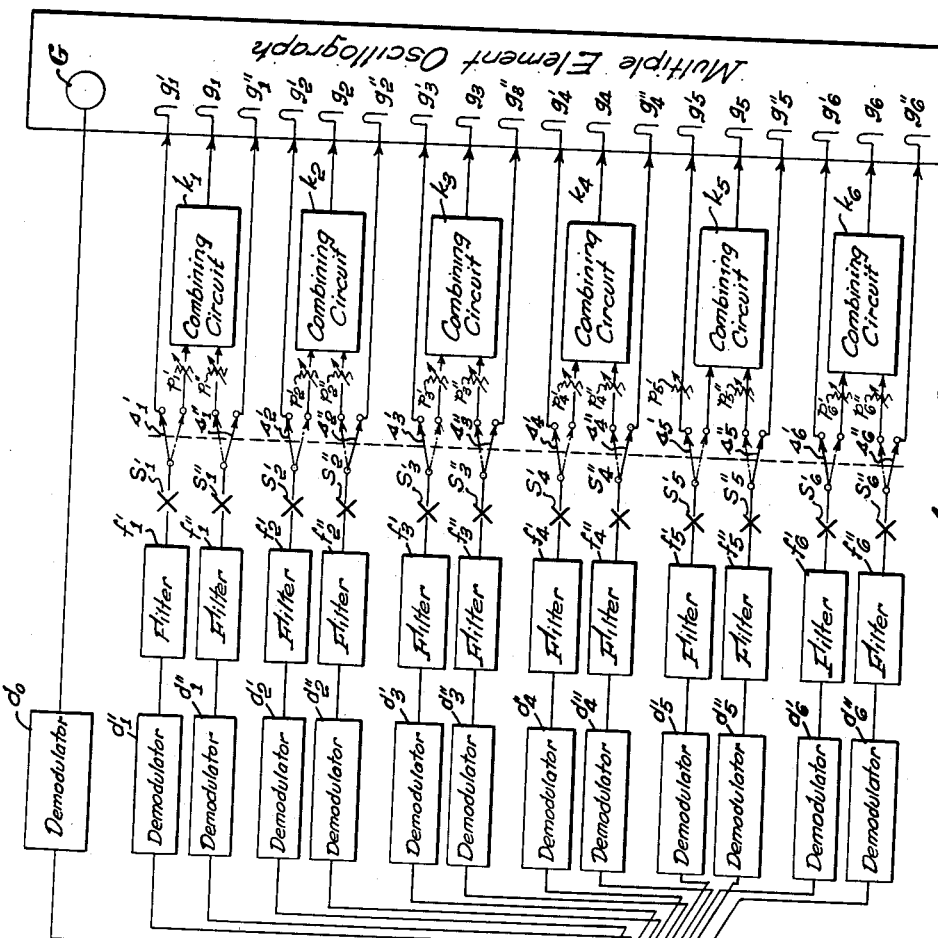
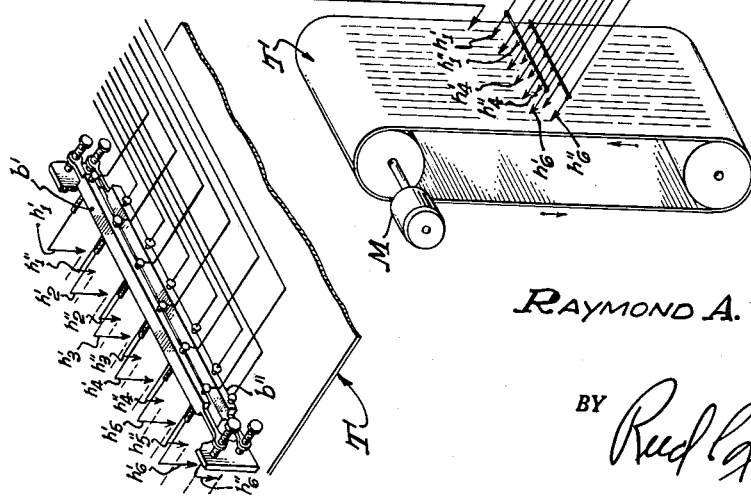
RAYMOND A. PETERSON,
INVENTOR.
BY
ATTORNEY.

July 31, 1956 R. A. PETERSON 2,757,357
SEISMIC WAVE FILTERING SYSTEM
Filed Aug. 12, 1953 4 Sheets-Sheet 3
FIG. 4.
FIG. 5.
FIG. 6.
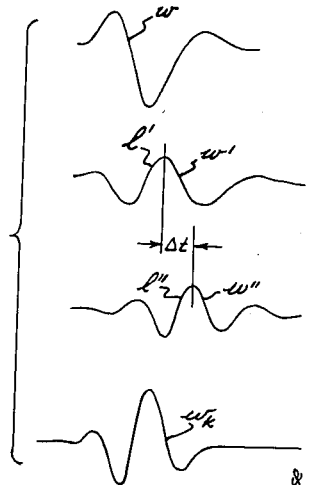
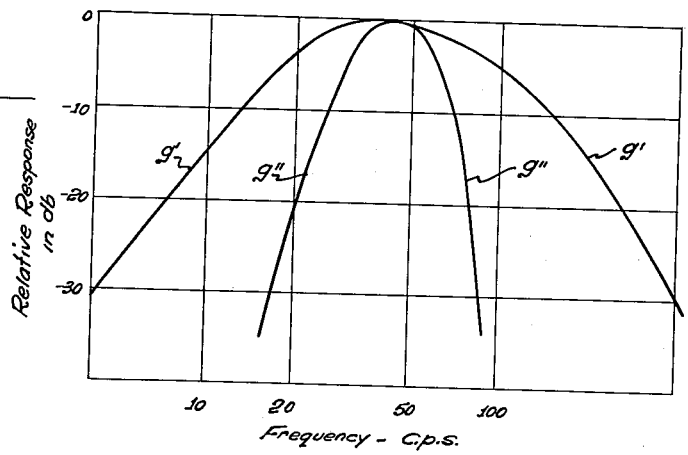
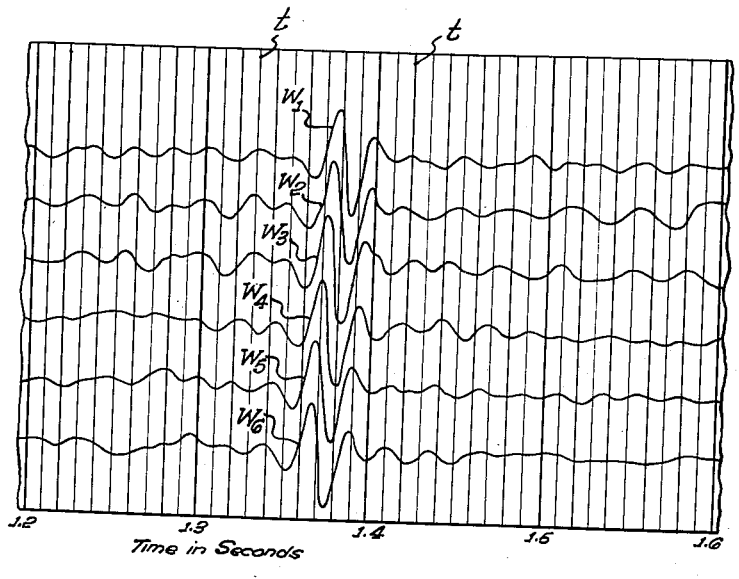
INVENTOR.
RAYMOND A. PETERSON,
BY
ATTORNEY.

July 31, 1956

R. A. PETERSON 2,757,357

SEISMIC WAVE FILTERING SYSTEM

Filed Aug. 12, 1953

RAYMOND A. PETERSON,
INVENTOR.

BY
*Reed C. Lawlor*
ATTORNEY.

United States Patent Office 2,757,357
Patented July 31, 1956

2,757,357

SEISMIC WAVE FILTERING SYSTEM

Raymond A. Peterson, Altadena, Calif., assignor, by mesne assignments, to United Geophysical Corporation, Pasadena, Calif., a corporation of California Application August 12, 1953, Serial No. 373,820

15 Claims. (Cl. 340—15)

This invention relates to seismic prospecting and more particularly to improvements in systems which involve the reception of reflected seismic waves at a series of reception points.

In reflection seismic surveying as generally practiced, seismic waves are generated by detonating an explosive charge at a point adjacent the surface of the earth. The seismic waves so generated travel downwardly through successive subterranean strata and small amounts of the energy in the seismic waves are reflected upwardly by the successive strata. The reflected waves that return to the surface of the earth from the various strata are detected there by means of geophones, or seismometers, that are located at various seismic wave receiving stations located at or adjacent the surface of the earth. At the same time random seismic disturbances in the nature of "noise" also affect the geophones. Such noise is due in part to the effect of wind on vegetation at the surface, in part to the diffraction and scattering of the seismic waves from irregularities beneath the surface of the earth, in part to surface waves generated by the explosive charge, and in part to spontaneous disturbances arising within the earth or otherwise. The reflected seismic waves and noise cause the geophones to vibrate thereby producing at their outputs corresponding electrical waves. After suitable amplification, filtering, or other treatment, the electric waves generated by the respective geophones are generally recorded as separate traces by means of a multiple element oscillograph.

As is well known, the time required for seismic waves to travel from a shot point to the various reception points is employed together with other data including measurements of the spacing of the various reception points from each other and the velocity of travel of the seismic waves, to determine the depth and the strike and dip of reflecting strata. By making such determinations at various positions throughout an area under investigation information is obtained as to the structure and even the character of subterranean strata thus providng a guide in determining whether to locate an exploratory well or other well in the area that is undergoing investigation or development, and if so where best to locate such a well.

The effectiveness of a reflection seismic surveying technique depends in part upon the ease with which reflected waves may be identified in the different traces of the recorded seismogram and also in part upon the accuracy with which the times of arrival of reflected waves at the various corresponding geophones may be measured. Both the recognition of reflected seismic waves and the measurements of their times of arrival at various corresponding geophones are important in the performance of a successful seismic survey. The reception and recording of noise along with the reflected seismic waves reduces the ease of recognizing the reflected seismic waves in the various traces and also reduces the accuracy with which their times of arrival may be measured on the traces. For this reason in practice, the electric waves generated by the geophones are frequently passed through frequency selective filters in order to attenuate some of the unwanted noise components compared with the desired reflected waves.

It is observed that when seismic waves are generated and detected in the manner described above, the simplest form of electric wave appearing at the output of a geophone consists of three successive legs or half waves and that the waves often consist of a larger number of legs or half waves. When such a wave is passed through a filter, its form is modified, frequently with an increase in the number of legs or half waves. The total duration of a filtered wave is generally longer than the duration of the wave prior to filtering. The increase in complexity of the filtered waves and the increase in duration of such waves also interfere with the recognition and the measurement of the times of arrival of seismic waves.

According to the present invention seismic waves received at each geophone are passed through a plurality of filters having different frequency response characteristics and the outputs of the filters are combined in order to facilitate the recognition of reflected waves and the measurements of their times of arrival at various geophones. The effectiveness of this invention is due in part to the fact that when an electrical wave representing a seismic wave is passed through different filters, the shapes of certain legs in the outputs are very similar, while the shapes of other legs are dissimilar and in any event the over-all appearance of the outputs of the different filters are similar in part but widely different in other parts. Furthermore, similar legs in the outputs of different filters are usually displaced from each other in time.

According to this invention, the outputs of the filters associated with each geophone are combined and a corrective time displacement is introduced prior to combining so that selected similar legs or parts of the outputs coincide in time and hence their effects become enhanced in the combining process. By bringing similar legs or parts into coincidence prior to combining, the dissimilar legs or parts are rendered noncoincident so that they tend to nullify each other in the mixing process. In effect the selected legs or parts are brought into phase while the other legs or parts are dephased prior to combining. As a result of this operation the selected legs or parts of the seismic wave are enhanced greatly in the combined output compared to the other parts of the seismic wave, thus, in effect, tending to shorten the duration of the output and to facilitate recognition of the selected leg or part. Also according to this invention the filters employed are so selected that they tend to emphasize certain frequency components of reflected seismic waves compared to other frequency components especially those which do not characterize reflected seismic waves but characterize only noise. For this reason and also because the noise signals that are characterized by such other frequency components tend to be dephased in passing through the filters, the amplitude of the noise components in the combined output is reduced compared to the amplitudes of the selected legs or parts. As a result of this invention, the signal-to-noise ratio is increased in the recorded traces thereby facilitating the recognition of reflected waves and increasing the accuracy of measurements of their times of arrival.

The foregoing and other advantages of this invention together with various objects and features thereof will become apparent from a reading of the following description taken in connection with the accompanying drawings wherein:

Fig. 1 is a schematic diagram of a seismic wave receiving and recording system employed in this invention;

Fig. 2 is a schematic diagram of a seismic wave reproducing system employed in this invention;

Fig. 3 is a schematic diagram of a system for adjusting the positions of the transducing heads;

Fig. 4 is a series of graphs employed in explaining the invention;

Fig. 5 is a graph showing frequency-response characteristics of band-pass filters employed in an embodiment of the invention;

Fig. 6 is a segment of a seismogram of the type produced in practicing the invention;

Figure 7:
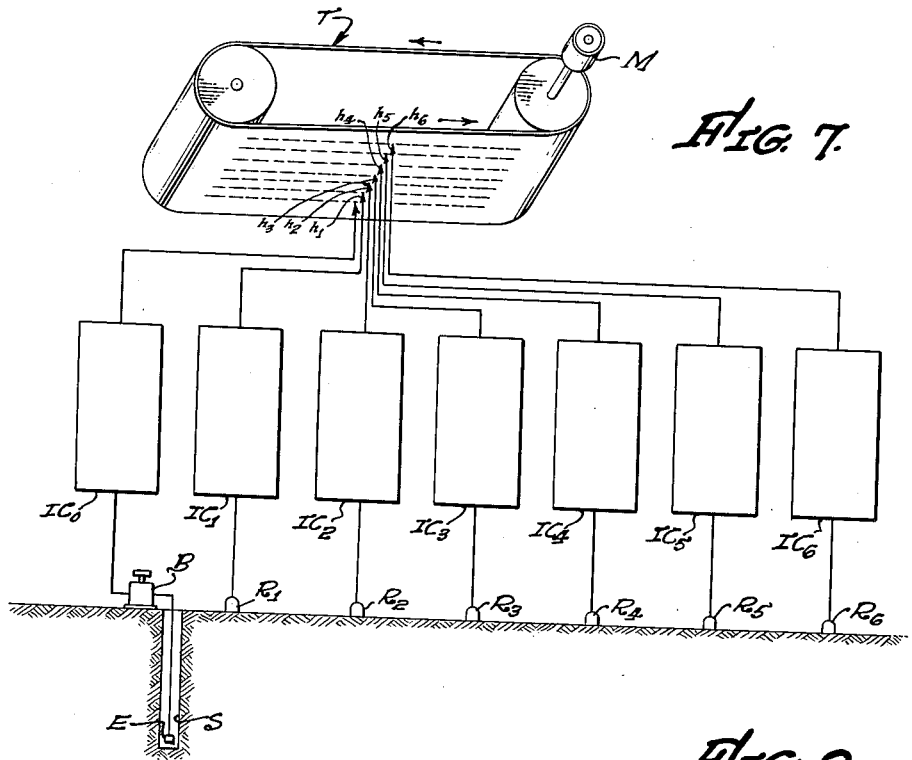
Fig. 7 is a schematic diagram of another form of seismic wave receiving and recording system employing this invention.

Referring to the drawings and particularly to Figs. 1 and 2, there is illustrated an embodiment of the invention in which seismic waves are first recorded on a magnetic tape and then reproduced, filtered and combined prior to being applied to a multiple element oscillograph. As shown in Fig. 1 a plurality of geophones or seismometers $R_1 \ldots R_6$ are arranged at mutually spaced points along the surface of the earth in line with a shot point S. Seismic waves generated by detonation of a charge of explosive E at the bottom of a hole at the shot point S travel outwardly therefrom and reach the various geophones $R_1 \ldots R_6$ after being reflected and refracted by various subterranean strata and after diffraction and scattering by irregularities therein as is well known in the art. The various geophones $R_1 \ldots R_6$ are of a well-known type which convert vibrations of the ground into electrical waves that correspond thereto in frequency, amplitude, and wave form.

The outputs of the respective geophones $R_1 \ldots R_6$ are passed through corresponding automatic-volume-controlled (AVC) amplifiers $A_1, A_2 \ldots A_6$ and are impressed upon corresponding frequency modulated oscillators, $O_1 \ldots O_6$ the outputs of which accordingly vary in frequency by an amount that deviates from a mean frequency in proportion to the instantaneous variations in the amplitude of the amplified output signals from the corresponding AVC amplifiers $A_1, A_2 \ldots A_6$. The output of each of the modulated oscillators $O_1, O_2 \ldots O_6$ is applied to a corresponding plurality of transducing heads $h'_1$ and $h''_1$, or $h'_2$ and $h''_2$, ... or $h'_6$ and $h''_6$. The transducing heads are arranged along a line transverse to the length of a magnetic tape T which is driven past the heads by means of a constant speed motor M. With this arrangement, a plurality of identical records are made corresponding to the output of each of the geophones along recording tracks or zones that extend lengthwise along the magnetic tape T. Thus if there are two heads that correspond to each of the geophones, twelve magnetic records are made along parallel tracks, adjacent pairs of tracks being identical. In addition to the foregoing, an auxiliary track is employed for recording the time break produced by the blaster B at the instant of detonation of the charge of explosive E and also for recording a timing signal generated by an oscillator O. Various features of such a system have been disclosed and claimed in copending patent applications Serial No. 349,407, Serial No. 366,214, and Serial No. 355,374 filed, respectively, by Raymond A. Peterson on April 17, 1953, by Lenard H. Johnson on July 6, 1953, and by Frank S. Boice et al. on May 15, 1953. Each of the tracks so recorded comprises a series of alternately oppositely polarized, magnetized areas, the distances between which vary inversely as the instantaneous values of the frequency of the output of the corresponding frequency modulated oscillator.

In Fig. 2 there is illustrated a system for reproducing, demodulating, filtering, combining and recording the magnetic records corresponding to individual geophones. This reproduction system includes a plurality of demodulators $d'_1, d''_1, d'_2, d''_2 \ldots$ connected respectively to corresponding transducing heads $h'_1, h''_1, h'_2, h''_2 \ldots$ the same heads being employed for reproducing as for recording. The outputs of the respective demodulators $d'_1, d''_1, d'_2, d''_2 \ldots$ are transmitted through corresponding filters $f'_1, f''_1, f'_2, f''_2 \ldots$ some of which $f'$ have one frequency characteristic and some of which $f''$ have different frequency characteristics as explained more fully hereinafter. A plurality of ganged, two-position switches $s'_1, s''_1, s'_2, s''_2 \ldots$ arranged at the outputs of the respective filters $f'_1, f''_1, f'_2, f''_2 \ldots$ are adapted to apply the outputs of the filters directly to corresponding galvanometer elements $g'_1, g''_1, g'_2, g''_2 \ldots$ of the multiple element oscillograph, or to feed the outputs to combining means $k_1, k_2 \ldots$ that correspond respectively to the geophones $R_1, R_2 \ldots$ Reversing switches $S'_1, S''_1, S'_2, S''_2$ are arranged between the outputs of the respective filters $f'_1, f''_1, f'_2, f''_2 \ldots$ and the corresponding two-position switches $s'_1, s''_1, s'_2, s''_2 \ldots$ In order to reproduce in oscillographic form the records that have been recorded on various tracks, the magnetic tape T is driven at constant speed by the motor M past the various heads $h'_1, h''_1, h'_2, h''_2 \ldots$ thereby causing corresponding frequency modulated waves to appear at their outputs. These signals correspond to those that appear at the outputs of the corresponding modulated oscillators $O_1, O_2 \ldots O_6$. During passage through the demodulators $d'_1, d''_1, d'_2, d''_2 \ldots$ the signals are transformed to wave forms in which the amplitude of the voltage varies with time in the same way that the velocity of the corresponding geophones varied with time in response to the arrival of seismic waves, taking into account, of course, the volume control action of the AVC amplifiers $A_1, A_2 \ldots A_6$. Thus at the output of each pair of demodulators $d'$ and $d''$ corresponding to a particular geophone R there is produced a pair of identical signals representing the seismic waves received by the corresponding geophone. These signals may be displaced relative to each other in time by displacing the corresponding reproducing heads relative to each other along the length of the magnetic tape.

A simple arrangement for displacing the reproducing heads, both individually and in sets along the length of the magnetic tape, is illustrated in Fig. 3. Here, it will be noted that the transducing heads $h'_1, h'_2 \ldots$ of one set are adjustably positioned relative to a bar $b'$ and that the other transducing heads $h''_1, h''_2 \ldots$ of the other set are adjustably positioned relative to a bar $b''$ and that the two bars $b', b''$ are movable relative to each other. With this arrangement, the positions of the individual heads of each set may be adjusted in any way desired relative to other heads in the same set, to make weathering corrections, or for other purposes. Once the heads in each set have been suitably positioned relative to the bars on which they are mounted, the two sets of heads may be adjusted in unison, one relative to the other, in order to displace signals applied to the corresponding sets of filters relative to each other. By applying equal adjustments to heads $h'$ and $h''$ corresponding to each geophone R, the signals from each geophone are similarly combined, as more fully explained hereinafter.

As explained above, one set of filters $f'_1, f'_2 \ldots$ has one frequency response characteristic and the other set of filters $f''_1, f''_2 \ldots$ has another frequency response characteristic. In the best mode of employing the invention now contemplated, the filters are of the band-pass type and their characteristics are so selected as to pass at least some frequency components of the reflected seismic waves which are to be detected. The pass bands of the two sets of filters generally overlap, sometimes even nesting one within the other. In Fig. 4 there are illustrated curves that indicate how the filters transform a simple seismic wave transmitted therethrough whereas in Fig. 5 the band-pass characteristics of the filters referred to are indicated.

When a simple seismic wave having three legs or half waves as represented by graph $w$ of Fig. 4 is passed through a filter $f'$ having a characteristic represented by the graph $g'$, the resultant output has the appearance of a wave represented by graph $w'$. When the same seismic wave is transmitted through a filter $f''$ having a characteristic represented by the graph $g''$, the resultant output has a shape represented by the graph $w''$. It will be noted that the waves appearing at the outputs of both filters are of longer duration than the wave applied to their inputs and that the output wave forms are more complex than the input wave forms, the output waves in fact having more legs or half waves. However, it will be noted that certain selected legs or half waves have a high amplitude and are readily correlatable. For example, in the particular examples shown the leg $l'$ of wave form $w'$ and the leg $l''$ of wave form $w''$ both have high amplitudes and are of a similar shape and duration. It will be noted, however, that the maximum values of these selected legs do not occur at the same time, but each is delayed by a different time interval relative to the time of application of input wave form $w$. In fact it will be noted that the maximum leg of the output of the filter $f''$ lags the maximum leg of the output of the filter $f'$ by a differential time $\Delta t$.

According to the present invention, the reproducing heads $h'_1$ and $h''_1$ are displaced relative to each other by such a distance as to introduce a time lead between the signals applied to the demodulators $d'_1$, $d''_1$ in such a direction as to cause the two corresponding selected legs of the waves $w'$ and $w''$ to occur simultaneously at the outputs of the filter. Then to accentuate part of the wave, these outputs are applied to the combining means $k_1$. The combining means may be in the form of a circuit which algebraically adds the outputs of the filters $f'$ and $f''$ or it may be in the form of a multiplying circuit or other convenient combining means. The result produced by additively combining the outputs of the filters $f'$ and $f''$ is illustrated in graph $w_k$ of Fig. 4. Here it will be noted that though the combined wave $w_k$ is of slightly longer duration than the input wave $w$, in effect, because of the bunching of the energy in a short time interval, the combined wave appears to be of shorter duration than the waves appearing at the outputs of the filters $f'$ and $f''$. Furthermore, certain parts are more highly accentuated relative to other parts than are the corresponding parts of the waves that appear at the outputs of the filters $f'$ and $f''$.

In one way of practicing the invention the heads $h'_1$, $h''_1$, $h'_2$, $h''_2$ . . . are aligned transversely of the record T in the same positions that they were in during the recording. Then with the ganged switches $s'_1$, $s''_1$, $s'_2$, $s''_2$ . . . set in their first positions the motor M is operated, driving the magnetic tape T past the heads. As the various record tracks move past the heads, waves corresponding to the seismic waves that were originally detected by the geophones are reproduced at the inputs of the corresponding filters. Thus waves corresponding to the seismic waves received by geophone $R_1$ are reproduced at the inputs of filters $f'_1$ and $f''_1$ and waves corresponding to the seismic waves received by geophone $R_2$ are reproduced at the inputs of filters $f'_2$ and $f''_2$ . . . After passing through the corresponding filters $f'_1$, $f''_1$, $f'_2$ and $f''_2$ . . . the seismic waves are recorded as oscillographic traces by means of the corresponding galvanometers $g'_1$, $g''_1$, $g'_2$, $g''_2$ . . . , thus producing a twelve trace record, two traces corresponding to each of the geophones. The resultant seismogram is then examined to identify reflected waves in some portion thereof which it is desired to study in more detail. Once such a reflection has been identified, the time displacement $\Delta t$ between selected parts thereof on traces corresponding to different filters is measured. This time displacement is a characteristic not only of the pair of filters employed, but also of the shape of the particular reflected wave which has been identified and the relationship of the legs that are to be synchronized. Then the heads are displaced relative to each other by amounts that are required to offset the observed time displacement.

In the selection of the parts or legs which are to be emphasized, it is sometimes found that the trace corresponding to the output of one of the filters will more nearly correlate in the selected region of a transient with the traces from the other filters if its polarity or phase is reversed. Advantage is taken of this fact by employing the reversing switches $S'_{11}$, $S''_{12}$, $S'_{21}$ and $S''_{22}$ . . . Thus reversing switch $S'_{11}$ provides means for reversing the polarity or phase of the output of filter $f'_1$, reversing switch $S''_{12}$ provides means for reversing the polarity or phase of the otuput of filter $f''_1$, etc. When it is found that reversal of the polarity of the output of one of the filters will increase the correlation between the selected parts or legs of its output and the corresponding parts or legs of the outputs from the other filters, the reversing switch associated with the first-named filter is operated. Then the relative spacing of the reproducing heads is adjusted to bring the selected parts or legs into coincidence. In addition, potentiometers $p'_1$, $p''_1$, $p'_2$, $p''_2$ . . . are employed after the switching between the outputs of the corresponding filters $f'_1$, $f''_1$, $f'_2$, $f''_2$ . . . and the input of the combining means $k_1$, $k_2$ . . . in order that the waves may be combined in any desired proportions. By suitable choice of such proportions, the parts of the waves which are not to be emphasized may be minimized in amplitude.

With the heads set to compensate for the time displacement introduced by the filters, the ganged switches $s'_1$, $s''_1$, $s'_2$ and $s''_2$ . . . are set in their second position thereby applying the outputs of the filters to the combining means. Under these conditions, when the magnetic tape is again driven past the recording heads, the outputs of the combining means are recorded as corresponding traces by means of the corresponding galvanometers $g_1$, $g_2$ . . . A section of a final record produced by the system showing six corresponding traces is illustrated in Fig. 6. Here it will be noted that reflected waves $W_1$, $W_2$, $W_3$ . . . $W_6$ are recognizable not only because of their high amplitude compared to the noise present in adjacent parts of the record, but also partly because of the regularity of the time displacements between waves recorded on successive pairs of adjacent traces. It will be noted that this record also exhibits timing lines $t$. These lines are produced on the seismogram by translating the signals recorded on the timer track of the magnetic tape into a timing signal by means of a reproducing-head and demodulator, and applying this signal to a time-line generator G forming part of the oscillograph.

It is not necessary, of course, to determine the displacement of the heads that is required for each record produced in an area. In the usual practice, it is found that the shape of reflected waves received in a particular part of a record is uniform over a wide area. In this case tables may be made which set forth the values of the displacement as a function of the time of the recorded section and as a function of the sets of filters that are employed. Once having determined such a set of values for a particular area, it is then only necessary to select filters for use in producing combined records of waves that arrive in a particular time interval after the detonation of the charge of explosive and to set the heads at a corresponding position. Then even though no reflection at all may be identified in the portions of particular records which are undergoing investigation when the records are reproduced without mixing, the signal-to-noise ratio of reflected waves that exist in such portions of the record will be increased by translating the seismic waves into corresponding electrical waves, passing these waves through filters having different characteristics and combining their outputs and making records thereof as explained above.

By selectively amplifying electrical waves corresponding to each reception point in a plurality of different frequency bands by means of the different filters, selected frequency components of the waves are emphasized relative to other frequency components, the degree of emphasis varying from one filter to another. If the centers spectrum of the noise is more or less uniform, the centers of the bands may be set more or less near the center of the amplitude spectrum of the reflected waves being filtered, but if the center of the noise spectrum is to one side of the center of the spectrum of the reflected waves the centers of the bands are offset to the opposite side of the signal spectrum for best results. As a result, the desired portions of the reflected waves are more easily recognized on the recorded traces.

It will be noted that as a result of the method described above selected legs or components of the waves are brought into phase prior to combining whereas other components are both attenuated and dephased. While the dephasing action may be incomplete, nevertheless where it does occur, it increases the effectiveness of the method in improving the signal-to-noise ratio of the recorded traces.

In the embodiment of the invention described above, the output of each geophone has been recorded on a plurality of tracks arranged side-by-side on the same endless magnetic tape T and the tracks corresponding to each geophone have been reproduced by means of separate pick-up heads $h'$ and $h''$ that are located at laterally displaced positions directly above the respective tracks as illustrated in Fig. 2. It will be understood, however, that the invention may be practiced by reproducing the output of each geophone as a single reproducing track and then reproducing each track by means of a plurality of sets of reproducing heads that may be adjustably positioned with respect to each other along the recorded tracks. A system of this type is illustrated in Figs. 7 and 8.

In Fig. 7, there is illustrated an arrangement similar to that in Fig. 1 in which the output of each seismometer $R_1 \ldots R_6$ is recorded as a separate single track on the magnetic tape T. Such a system is substantially identical with that illustrated in Fig. 1, except that only one recording head $h_1 \ldots h_6$ is employed to record the output produced by each of the corresponding seismometers $R_1 \ldots R_6$. Thus, as illustrated in Fig. 7, the output of each seismometer $R_1 \ldots R_6$ is passed through a corresponding input channel $IC_1 \ldots IC_6$ to a corresponding recording head $h_1 \ldots h_6$. Each of the input channels IC includes an amplifier A and a frequency oscillator O as illustrated in Fig. 1. Likewise, an input channel $IC_0$ comprising an oscillator $O_0$, an amplifier $A_0$, and a modulated oscillator $O_0$ as illustrated in Fig. 1 is employed to record the time break and the timing line or timing wave. Thus, with this arrangement, seven tracks are recorded on the magnetic tape T, one representing the timing wave and six representing the outputs of the six seismometers $R_1 \ldots R_6$.

Figure 8:
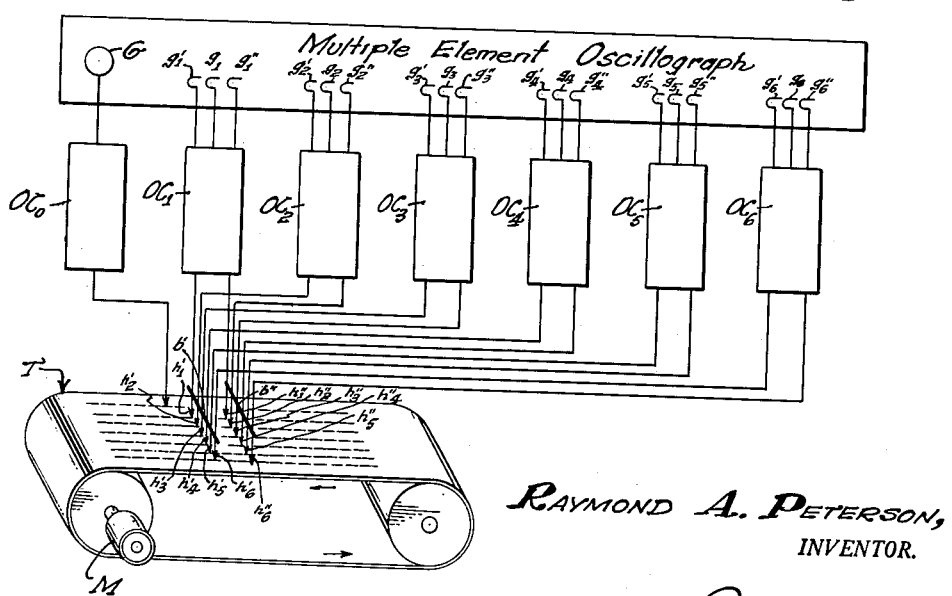
Fig. 8 is a schematic diagram of another form of seismic wave reproducing system employing this invention.

In Fig. 8, there is illustrated an arrangement for reproducing the signals recorded on the magnetic tape in accordance with the system of Fig. 7. In this reproducing system, two sets of transducing heads are employed. One set of transducing heads $h'_1, h'_2 \ldots$ are mounted on a bar $b'$. Likewise, the second set of transducing heads $h''_1, h''_2 \ldots$ of a second set are mounted on a second bar $b''$. This arrangement is similar to that illustrated in Fig. 2, except that in this case one head of each set is located opposite the same track on the magnetic tape T. Thus, the two heads $h'_1, h''_1$ are aligned with and located opposite the track on which the output from the seismometer $R_1$ is recorded. In a similar way, the two heads $h'_2, h''_2$ are aligned with and located opposite the track on which the output from the seismometer $R_1$ is recorded. The outputs of each pair of heads associated with the track of a particular seismometer are supplied to a corresponding output channel OC. Thus, the outputs of the pair of transducing heads $h'_1$ and $h''_1$ are applied to the output channel $OC_1$. This output channel includes demodulators $D'_1, D''_1$, filters $F'_1, F''_1$, switches $S'_1, S''_1$, switches $s'_1, s''_1$, potentiometers $P'_1, P''_1$, and combining circuit $k_1$ of the type illustrated in Fig. 2. The output of the output channel $OC_1$ is supplied to galvanometers $g'_1, g_1$, and $g''_1$ of the multiple element oscillograph. The various parts of the output chanel $OC_1$ cooperate to combine signals reproduced by the two transducing heads $h'_1$ and $h''_1$ in the manner previously described to produce oscillograph traces in the multiple element oscillograph. Each of the other output channels $OC_2, OC_3, OC_4, OC_5$, and $OC_6$ are of similar construction and they likewise operate to combine the signals detected by the transducing heads at their respective inputs to produce signals at the galvanometers at their outputs. Thus, it is seen that it is possible to employ only one reproducible track for each geophone provided that a plurality of reproducing heads are employed that are sufficiently small so that they may be located with respect to the tracks with suitable displacement for combining the outputs of the filters according to the principles employed in the systems of Figs. 1 and 2. In such a case, records identical with those produced with the oscillograph of Fig. 2 may be produced even though only one track is employed to record the output of each seismometer.

While the invention has been described above only with reference to a particular embodiment thereof in which two records are made of the seismic waves received at each geophone and the records are separately translated and filtered in a corresponding pair of filters, it will be obvious that the invention may be modified in many ways without departing from the fundamental principles thereof. Thus if desired, a larger number of filters and corresponding record tracks may be employed together with the other associated equipment. Furthermore, it is even possible to practice the invention without employing any reproducible record whatever. In this case the outputs of the respective geophones are passed through suitable delay networks to the filters prior to application of the filter outputs to the combining circuits. It is therefore to be understood that the invention is not limited to the specific embodiment thereof which has been described above but is capable of being embodied in many different forms within the scope of the appended claims.

What is claimed is:

1. In apparatus for seismic prospecting: a geophone for receiving seismic waves arriving at a point in the earth and for converting said seismic waves into corresponding electrical waves; means for translating the output of said geophone into a plurality of similar trains of electrical waves that are displaced in time from each other; a plurality of filtering means having different frequency-response characteristics; means for applying the time-displaced electrical waves to the inputs of said filtering means; means for combining the outputs of said filtering means; and means for recording the combined outputs as a function of time.

2. In apparatus for seismic prospecting: a geophone for receiving seismic waves arriving at a point in the earth and for converting said seismic waves into corresponding electrical waves; means for translating the output of said geophone into a plurality of similar trains of electrical waves that are displaced in time from each other; means for varying the time displacement between said wave trains; a plurality of filtering means having different frequency-response characteristics; means for applying the time-displaced electrical waves to the inputs of said filtering means; means for combining the outputs of said filtering means; and means for recording the combined outputs as a function of time.

3. In apparatus for seismic prospecting: a geophone for receiving seismic waves arriving at a point in the earth and for converting said seismic waves into corresponding electrical waves; means for translating the output of said geophone into a plurality of similar trains of electrical waves; a plurality of filtreing means having different frequency-response characteristics; means for applying the respective trains of electrical waves to the inputs of corresponding filtering means; means for separately recording the outputs of said filtering means as a function of time; means for displacing said electrical wave trains relative to each other in time prior to application thereof to said inputs; means for combining the outputs of said filtering means while displaced electrical wave trains are applied to their inputs; and means for recording the combined outputs as a function of time.

4. In a method of seismic prospecting in which seismic waves are generated at a shotpoint and are then received at a series of reception points that are spaced apart from each other and from the shotpoint, the received waves including noise and also reflected waves, the steps of: translating the seismic waves received at each reception point into corresponding electrical waves; filtering the electrical waves corresponding to each reception point in a plurality of different ways whereby electrical waves are produced that are similar in part and dissimilar in other parts; and combining the filtered electrical waves corresponding to each reception point to additively combine similar parts of the waves wherbey a combined wave having a part of increased recognizability is produced.

5. In a method of seismic prospecting in which seismic waves are generated at a shotpoint and are then received at a series of reception points that are spaced apart from each other and from the shotpoint, the steps of: translating seismic waves received at each reception point into corresponding electrical waves; selectively amplifying the electrical waves corresponding to each reception point in a plurality of different bands whereby selected frequency components of the waves are emphasized relative to other frequency components; and combining the amplified electrical waves corresponding to each reception point to additively combine the selected frequency components whereby the recognizability of parts of said waves is increased.

6. In a method of seismic prospecting in which seismic waves are generated at a shotpoint and are then received at a series of reception points that are spaced apart from each other and from the shotpoint, the steps of: translating seismic waves received at each reception point into corresponding electrical waves; filtering the electrical waves corresponding to each reception point in a plurality of different ways; emphasizing selected components of the waves in all the filtering operations; and combining the filtered electrical waves corresponding to each reception point to additively combine the selected components and to subtractively combine other components whereby the recognizability of said selected frequency components is increased.

7. In apparatus for seismic prospecting: a plurality of geophones for receiving seismic waves arriving simultaneously at various spaced points in the earth and for converting said seismic waves into corresponding electrical waves at their respective outputs; means for recording the outputs of said geophones as corresponding reproducible records along the length of a record strip; means including a plurality of reproducing heads associated with each geophone for converting the waves recorded on the record strip into corresponding electrical waves, whereby electrical waves corresponding to seismic waves received by each geophone are produced; filtering means connected to the output of each reproducing head, the filtering means connected to heads associated with each geophone having different frequency characteristics; means for relatively displacing the heads corresponding to each geophone along the length of the record strip, whereby the latter electrical waves corresponding to each geophone are displaced in time relative to each other by such an amount as to bring selected parts of the filtered outputs associated with each geophone into phase with each other; means for combining the outputs of filters associated with the respective geophones; and means for recording the respective combined outputs as separate functions of time having a common base whereby the relative times of arrival of such seismic waves at the geophones may be ascertained.

8. In apparatus for seismic prospecting: a plurality of geophones for receiving seismic waves arriving simultaneously at various spaced points in the earth and for converting said seismic waves into corresponding electrical waves at their respective outputs; means for recording the outputs of said geophones as corresponding reproducible records along the length of a record strip; means including a plurality of reproducing heads associated with each geophone for converting the waves recorded on the record strip into corresponding electrical waves whereby electrical waves corresponding to seismic waves received by each geophone are produced; band-pass filtering means connected to the output of each reproducing head; different filtering means connected to heads associated with each geophone having overlapping pass bands but different cut-off frequencies; means for relatively displacing the heads corresponding to each geophone along the length of the record strip whereby the latter electrical waves corresponding to each geophone are displaced in time relative to each other by such an amount as to bring selected parts of the filtered outputs associated with each geophone into phase with each other; means for combining the outputs of filters associated with the respective geophones; and means for recording the respective combined outputs as separate functions of time having a common base whereby the relative times of arrival of such seismic waves at the geophones may be ascertained.

9. In apparatus for seismic prospecting: a plurality of geophones for receiving seismic waves arriving simultaneously at various spaced points in the earth and for converting said seismic waves into corresponding electrical waves at their respective outputs; means for recording the outputs of said geophones as corresponding reproducible records along the length of a record strip; a plurality of sets of reproducing heads associated with said geophones, one head of each set being adapted to convert the recorded waves from a corresponding geophone into corresponding electrical waves, whereby electrical waves corresponding to seismic waves received by each geophone are produced; a plurality of sets of filtering means connected to the respective sets of heads, the filtering means of each set having similar frequency-response characteristics and the filtering means of different sets having different frequency-response characteristics; means for displacing the sets of heads relative to each other in unison along the length of the record strip whereby the waves from each geophone are reproduced as a plurality of similar trains of electrical waves that are displaced in time relative to each other by such an amount as to bring selected parts of the filtered outputs associated with each geophone into phase with each other; means for combining the outputs of filtering means connected to heads associated with each of said geophones; and means for recording the respective combined outputs as separate functions of time having a common base whereby the relative times of arrival of such seismic waves at the geophones may be ascertained.

10. In apparatus for seismic prospecting: a plurality of geophones for receiving seismic waves arriving simultaneously at various spaced points in the earth and for converting said seismic waves into corresponding electrical waves at their respective outputs; means for recording the outputs of said geophones as corresponding reproducible records along the length of a record strip; means including a plurality of sets of reproducing heads associated with said geophines, one head of each set being adapted to convert the recorded waves from a corresponding geophone into corresponding electrical waves, whereby electrical waves corresponding to seismic waves received by each geophone are produced; a plurality of sets of filtering means connected to the respective sets of heads, the filtering means of each set having similar frequency-response characteristics and the filtering means of different sets having different frequency-response characteristics; means for displacing the sets of heads relative to each other in unison along the length of the record strip whereby the waves from each geophone are reproduced as a plurality of similar trains of electrical waves that are displaced in time relative to each other by such an amount as to bring selected parts of the filtered outputs associated with each geophone into phase with each other; means for combining the outputs of filtering means connected to heads associated with each of said geophones; and means for recording the respective combined outputs as separate functions of time having a common base whereby the relative times of arrival of such seismic waves at the geophones may be ascertained.

11. In apparatus for seismic prospecting: a plurality of geophones for receiving seismic waves arriving simultaneously at various spaced points in the earth and for converting said seismic waves into corresponding electrical waves at their respective outputs; means for recording the output of each geophone as a plurality of corresponding reproducible records along the length of a record strip; a plurality of reproducing heads associated with each geophone for converting the waves recorded on the record strip into corresponding electrical waves; means for moving such record strip past said reproducing heads whereby electrical waves corresponding to seismic waves received by each geophone are produced; filtering means connected to the output of each reproducing head; different filtering means connected to heads associated with each geophone having different frequency characteristics; means for relatively displacing the heads corresponding to each geophone along the length of the record strip, whereby the latter electrical waves corresponding to each geophone are displaced in time relative to each other by such an amount as to bring selected parts of the filtered outputs associated with each geophone into phase with each other; means for combining the outputs of filters associated with the respective geophones; and means for recording the respective combined outputs as separate functions of time having a common base whereby the relative times of arrival of such seismic waves at the geophones may be ascertained.

12. In apparatus for seismic prospecting: a plurality of geophones for receiving seismic waves arriving simultaneously at various spaced points in the earth and for converting said seismic waves into corresponding electrical waves at their respective outputs; means including a plurality of transducing heads for recording the output of each geophone as a plurality of corresponding reproducible records along the length of a record strip; filtering means connected to said transducing heads for converting the waves recorded on the record strip into corresponding electrical waves, the filtering means connected to different heads associated with each geophone having corresponding different frequency characteristics; means for relatively displacing the heads corresponding to each geophone along the length of the record strip whereby the waves from each geophone are reproduced as a plurality of similar electrical waves that are displaced in time relative to each other by such an amount as to bring selected parts of the filtered outputs associated with each geophone into phase with each other; means for combining the outputs of filters associated with the respective geophones; and means for recording the respective combined outputs as separate functions of time having a common base whereby the relative times of arrival of such seismic waves at the geophones may be ascertained.

13. In apparatus for seismic prospecting: a geophone for receiving seismic waves arriving at a point in the earth and for converting said seismic waves into corresponding electrical waves; a plurality of filtering means having different frequency-response characteristics; means for applying the electrical waves in parallel to the inputs of said filtering means, whereby filtered signals having different shapes appear at the outputs of said filtering means; adjustable time delay means for relatively delaying the filtered signals by such amounts as to bring selected parts of the filtered outputs into phase with each other; means for combining the outputs of said filtering means; and means for recording the combined outputs as a function of time.

14. In apparatus for seismic prospecting: a geophone for receiving seismic waves arriving at a point in the earth and for converting said seismic waves into corresponding electrical waves; a plurality of filtering means having different frequency-response characteristics; means for applying the electrical waves in parallel to the inputs of said filtering means, whereby filtered signals having different shapes appear at the outputs of said filtering means; adjustable time delay means for relatively delaying the signals applied to said filters by such amounts as to bring selected parts of the filtered outputs into phase with each other; means for combining the outputs of said filtering means; and means for recording the combined outputs as a function of time.

15. In apparatus for seismic prospecting: a geophone for receiving seismic waves arriving at a point in the earth and for converting said seismic waves into corresponding electrical waves; a plurality of filtering means having different frequency-response characteristics; means for applying the electrical waves in parallel to the inputs of said filtering means, whereby filtered signals having different shapes appear at the outputs of said filtering means; adjustable time delay means for relatively delaying the filtered signals by such amounts as to bring selected parts of the filtered outputs into phase with each other; means for combining the outputs of said filtering means; means for reversing the polarity of said filtered outputs prior to combining; and means for recording the combined outputs as a function of time.

References Cited in the file of this patent

UNITED STATES PATENTS

| | | |
|---|---|---|
| 2,144,812 | Rieber | Jan. 24, 1939 |
| 2,427,421 | Rieber | Sept. 16, 1947 |
| 2,496,648 | Wolf | Feb. 7, 1950 |
| 2,558,868 | McCarty | July 3, 1951 |
| 2,638,402 | Lee | May 12, 1953 |
| 2,661,464 | Wolf | Dec. 1, 1953 |